G. HAVELL,

Assignor to F. STEVENS, J. ROBERTS & G. HAVELL.

Satchel and Traveling-Bag Handle.

No. 8,051. Reissued Jan. 22, 1878.

WITNESSES

Henry N. Miller

Frank Galt

INVENTOR

George Havell,

Alexander Mason

ATTORNEYS.

N. PETERS, PHOTO-LITHOGRAPHER, WASHINGTON, D. C.

UNITED STATES PATENT OFFICE.

GEORGE HAVELL, OF NEWARK, NEW JERSEY, ASSIGNOR TO FREDERICK STEVENS, JAMES ROBERTS, AND GEORGE HAVELL, OF SAME PLACE.

IMPROVEMENT IN SATCHEL AND TRAVELING-BAG HANDLES.

Specification forming part of Letters Patent No. 158,077, dated December 22, 1874; Reissue No. 8,051, dated January 22, 1878; application filed June 13, 1877.

*To all whom it may concern:*

Be it known that I, GEORGE HAVELL, of Newark, New Jersey, have invented a certain new and useful Improvement in Satchel, Valise, and Traveling-Bag Handles, of which the following, taken in connection with the accompanying drawings, is a full, clear, and exact description.

It is the object of my improvement to provide a satchel or traveling-bag handle which, while being substantial and large enough to be conveniently grasped in the hand, is nevertheless light, and is capable of being manufactured at small cost; and my invention consists in a curved tubular handle made of sheet metal.

As it is desirable that the quantity of material used shall be so distributed as to contribute in the highest degree to the strength of the handle, it is an incidental feature of my invention that the tubular handle is tapered toward both ends. It thus follows that the middle, by its enlargement relatively to the ends, is suitably strengthened to resist the greater tendency of the handle to bend at that point.

The accompanying drawings, illustrating my invention, exhibit a handle made of two pieces of sheet metal, which are struck up in the form of curved troughs, tapering each way toward their ends, and semicircular in cross-section, and which are joined together at their edges, and held by a transverse strap or collar, which embraces them in the middle, and by ferrules at their ends, the ends being turned outwardly in opposite directions, to constitute the journals for the reception of the pivots upon which the handle turns, and by which it is connected to the valise or bag.

Figure 1:
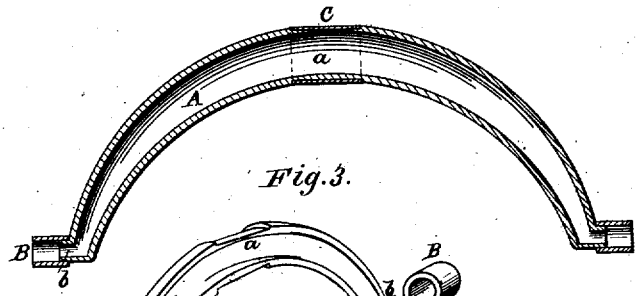
Figure 3:
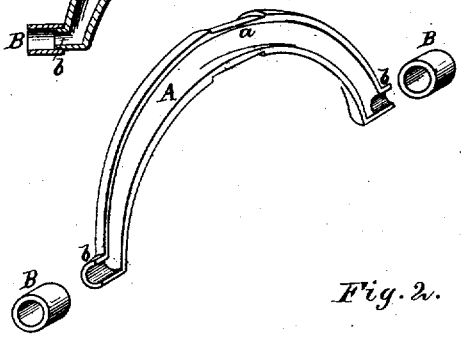
Figure 2:
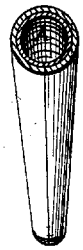

The drawings are as follows: Figure 1 is a central longitudinal section of the handle. Fig. 2 is a transverse section through the line *x x* on Fig. 1. Fig. 3 is a perspective view of one of the pieces of sheet metal struck up in the form of a curved tapering trough, and the ferrules by which the outwardly-turned ends of two such pieces are held together.

The handle is composed of two similar curved troughs of sheet metal, A, the middle portions of which are recessed on the outside, to afford the cylindrical bearing *a* for the strap or collar C, which embraces the bearing, and is soldered in place. As the troughs taper each way from the ends of the cylindrical bearing *a*, they form, when placed together, a correspondingly-tapering tube. At their ends the troughs are turned outward to form the hollow bearings or journals *b*, for the reception of the pivots upon which the handle is sustained. The outwardly-turned ends *b* of the two troughs are inserted in and confined by the ferrules or collars B, which are also soldered in place.

By this mode of construction a satchel-handle is produced which is large enough to be conveniently grasped by the hand, but which is light by reason of being hollow, and yet is strong, because of the effective distribution of the metal of which it is composed, and which can be manufactured rapidly and at small cost.

I claim as my invention—

1. A curved tubular sheet-metal handle, having its ends adapted to be attached to a satchel or other object by a hinged joint.

2. A curved tubular handle formed of sheet metal, having a uniformly-tapering shape each way from its central portion toward its ends, substantially as described.

3. A curved tubular handle formed of sheet metal, having its ends so bent as to form hollow bearings or journals for the reception of the pivots by which the handle is sustained, substantially as described.

4. A curved tubular handle formed of the two pieces of sheet metal A, externally recessed in the middle to form the bearing *a*, and provided with the end projections *b b*, in combination with the central collar C and the end ferrules B B, substantially as described.

In testimony that I claim the foregoing I have hereunto set my hand this 9th day of June, 1877.

GEORGE HAVELL.

Witnesses:

H. A. KINGSLEY,

JOHN OTTO.